March 4, 1952 W. R. SCHETTLER 2,588,168
BRAKE RIGGING
Filed March 25, 1950
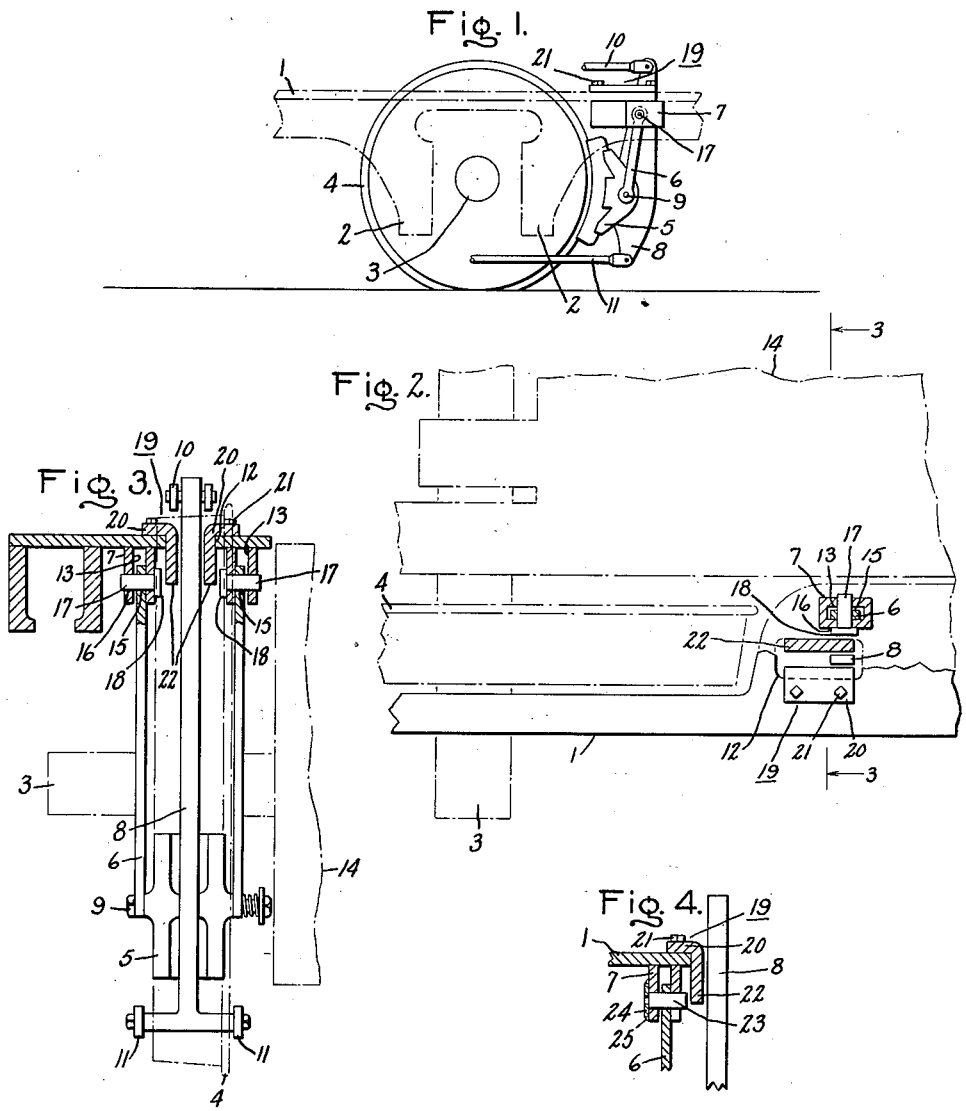
Inventor:
William R. Schettler,
by Ernest C. Britton
His Attorney Patented Mar. 4, 1952

2,588,168

UNITED STATES PATENT OFFICE 2,588,168

BRAKE RIGGING

William R. Schettler, Lawrence Park, Pa., assignor to General Electric Company, a corporation of New York Application March 25, 1950, Serial No. 151,964

4 Claims. (Cl. 188—33)

This invention relates to a brake rigging for a rail vehicle truck and more particularly to a clasp-type brake rigging in which an improved brake hanger pin locking arrangement is utilized.

In rail vehicle trucks, particularly those having motored axles, conventional brake hanger pin locking arrangements frequently cannot be used due to the proximity of the motor frame to the brake hanger support and in addition, the conventional locking arrangements require access from below which is not a desirable feature. It is therefore desirable in the design of brake rigging to provide an arrangement permitting the installation of brake hanger pins from above the truck in order to eliminate the necessity for removing the trucks from the vehicle or lowering the motors for assembling or disassembling the brake rigging. Furthermore, there is a tendency for the brake lever to wear the sides of the slot in the truck frame in which it moves back and forth and it is therefore desirable to provide a wear plate to eliminate this wearing of the sides of the brake lever slot in the truck frame.

An object of this invention is to provide an improved brake rigging for rail vehicle trucks.

Another object of this invention is to provide an improved brake rigging for rail vehicle trucks in which improved means are provided for retaining the brake hanger pin in position.

A further object of this invention is to provide an improved brake rigging for rail vehicle trucks having improved means for locking the brake hanger pin and for preventing wear on the truck frame by movement of the brake lever.

A still further object of this invention is to provide an improved brake hanger pin locking and brake lever wear plate member.

Further objects and advantages of this invention will become apparent and the invention will be better understood from the following description referring to the accompanying drawing, and the features of novelty which characterize this invention will be pointed out with particularity in the claims annexed to and forming a part of this specification.

In accordance with one aspect of this invention, there is provided a brake hanger lever pivotally secured to a brake hanger lever support on the truck frame by a brake hanger pin having a shoulder for preventing axial movement of the pin in one direction. The brake hanger lever supports the brake shoe and a brake operating lever is provided for applying the brake shoe, the brake operating lever extending through an opening in the truck frame. An L-shaped member is provided having one leg removably secured to the truck frame and its other leg extending through the brake operating lever opening in the truck frame and adjacent the shouldered end of the brake hanger pin for preventing axial movement of the pin in the other direction. The leg portion of the L-shaped member which extends through the opening in the truck frame forms a wear plate preventing wear on the sides of the opening by movement of the brake operating lever. This member can be readily removed permitting removal of the brake hanger pin from above the truck.

In the drawing Fig. 1 is the side elevation view of a portion of a rail vehicle truck provided with improved brake rigging of this invention; Fig. 2 is a top view partly in section illustrating the construction of Fig. 1; Fig. 3 is a cross-sectional view taken along the line 3—3 of Fig. 2; and Fig. 4 is a fragmentary view illustrating a modified form of this invention.

Referring now to Fig. 1, there is shown a portion of a rail vehicle truck having a frame 1 with integrally formed pedestal jaws 2 providing the usual means of connection with the axle 3 and wheel 4. A brake shoe 5 is provided which is supported by a brake hanger lever 6. The brake hanger lever 6 is pivotally mounted by a brake hanger lever support 7, as will be hereinafter described. The brake operating lever 8 is connected to the brake shoe 5 by the same pivotal connection 9 which connects the brake hanger lever 6 and the brake shoe. The brake operating lever 8 is adapted to be moved to apply brake shoe 5 by an operating rod 10 and a brake rod 11 serves to connect other elements in the brake rigging (not shown).

Referring now to Figs. 2 and 3, it will be seen that the frame 1 is provided with an opening or slot 12 through which the brake operating lever 8 extends. A brake hanger support member 7 is secured to the under side of the frame on either side of the opening 12, each of the brake hanger lever support members being formed with a longitudinal slot 13 formed therein to receive the brake hanger levers 6. In the motored truck shown, the traction motor 14 is suspended in the conventional manner from the axle 3. It will be readily seen that the motor frame is in close proximity to the truck frame and the inner brake hanger support 7. Therefore, in order to permit assembly and disassembly of the brake rigging without requiring the removal of the truck from the vehicle or the lowering of the motor 14, the arrangement now to be described is provided.

Each brake hanger lever 6 has an opening 15 formed in its end remote from the brake shoe 5 and corresponding openings 16 are formed through the brake hanger lever supports 7. Brake hanger lever pins 17 are respectively positioned in the openings 15 and 16 to pivotally support the brake hanger levers 6. In the embodiment shown in Figs. 2 and 3, the brake hanger pins 17 are formed with shoulders 18 at their ends toward the brake operating lever 8 thus preventing axial movement of the brake hanger lever pins 17 out of the openings in the brake hanger lever support and the brake hanger levers in a direction away from the brake operating lever 8. In order to retain the pins 17 in position and yet to permit them to turn freely in their bushings, a brake hanger lever pin retaining and brake operating lever wear plate member 19 is provided on each side of the brake operating lever 8. These members are L-shaped having their first leg portions 20 secured to the upper surface of the truck frame 1 in any suitable manner, as by bolts 21. The other leg portion 22 extends through the opening 12 in the truck frame 1 to a point adjacent the pin 15 where it will retain the shouldered end 18 against axial movement in a direction toward the brake operating lever 8. In this construction, the width of the slot 12 in truck frame 1 should be greater than the length of the brake hanger lever pins 15. Thus, in order to remove the brake hanger lever pins 15 to disassemble the brake rigging, it is merely necessary to remove the two members 19 by removing the bolts 21. It will be readily apparent that this operation can be performed entirely from above the truck without necessitating the removal of the truck or lowering of the motor 14.

In addition to its function of retaining the brake hanger lever pins 15 in position, the members 19 also serve as wear plates for the brake operating lever 8. When the brake operating lever 8 moves back and forth inside the slot 12 in the frame 1, there is a tendency for the lever to wear the sides of the slot in the truck frame. The leg portions 22 of the members 19, being arranged on either side of the brake operating lever 8 and parallel to its movement, serve as wear plates to prevent wear on the sides of the slot 12 by the movement of the brake operating lever. It is thus a simple matter to replace the locking and wear plate member 19 when the leg portions 22 have become excessively worn.

Referring now to Fig. 4 in which like parts are indicated by like reference numerals, there is shown a modification of this invention in which a straight brake hanger lever pin 23 is provided rather than the shouldered pin 15 of Figs. 2 and 3. In order to retain pin 23 against axial movement away from the brake operating lever 8, a suitable plate or washer 24 is secured to the side of the brake hanger lever support 7 remote from the brake operating lever 8 in any suitable manner, as by welding, as shown at 25. The leg portion 22 of the locking and wear plate member 19 again extends adjacent the other end of the pin 23 retaining the pin against axial movement toward the brake operating lever 8.

It will now be readily apparent that this invention permits the installation and removal of freely rotating brake hanger lever pins from above the truck thus eliminating the necessity for removing the truck from the vehicle or lowering the motors in order to assemble or disassemble the brake rigging. Furthermore, additional protection against wear is provided for the truck frame.

While I have illustrated and described a particular embodiment of this invention, modifications thereof will occur to those skilled in the art. I desire it to be understood, therefore, that this invention is not to be limited to the particular arrangement disclosed and I intend in the appended claims to cover all modifications which do not depart from the spirit and scope of this invention.

What I claim as new and desire to secure by Letters Patent of the United States is:

1. In a rail vehicle truck having a frame with a supporting wheel and axle, a brake rigging comprising a brake shoe adapted for engagement with the rim of said wheel, a brake hanger lever for supporting said brake shoe and having an opening at its end remote from said brake shoe, a brake hanger lever support on said frame having an opening formed therein, a brake operating lever for applying said brake shoe adapted for movement with respect to said frame, a pin for pivotally securing said brake hanger lever to said support arranged in said openings in said brake hanger lever and said support, and a brake hanger pin retaining and brake operating lever wear plate member having a first portion removably secured to said frame and a second portion extending adjacent an end of said pin for retaining said pin in position, said second portion being arranged parallel to the movement of said brake operating lever for providing a wear plate to prevent wear on said frame by movement of said brake operating lever.

2. In a rail vehicle truck having a frame with a supporting wheel and axle, a brake rigging comprising a brake shoe adapted for engagement with the rim of said wheel, a brake hanger lever for supporting said brake shoe and having an opening formed therein at its end remote from said brake shoe, a brake hanger lever support on said frame having an opening formed therein, a brake operating lever for applying said brake shoe adapted for movement with respect to said frame, a pin for pivotally securing said brake hanger lever to said support arranged in said openings in said brake hanger lever and said support, means for preventing said pin from moving axially in one direction, and a brake hanger pin retaining and brake operating lever wear plate member having a first portion removably secured to said frame and a second portion extending adjacent an end of said pin for preventing said pin from moving axially in the other direction, said second portion being arranged parallel to the movement of said brake operating lever for providing a wear plate to prevent wear on said frame by movement of said brake operating lever.

3. In a rail vehicle truck having a frame with a supporting wheel and axle, a brake rigging comprising a brake shoe adapted for engagement with the rim of said wheel, a brake hanger lever for supporting said brake shoe and having an opening formed therein at its end remote from said shoe, a brake hanger lever support on said frame having an opening formed therein, said frame having an opening formed therein, a brake operating lever for applying said brake shoe extending through said frame opening and adapted for movement therein, a pin for pivotally securing said brake hanger lever to said support arranged in said openings in said brake hanger and said support, and a brake hanger pin retaining and brake operating lever wear plate member having a first portion removably secured to said frame and a second portion extending through said frame opening and adjacent an end of said pin for retaining said pin in position, said second portion being arranged parallel to the movement of said brake operating lever for providing a wear plate to prevent wear on the sides of said frame opening by movement of said brake operating lever.

4. In a rail vehicle truck having a frame with a supporting wheel and axle, a brake rigging comprising a brake shoe adapted for engagement with the rim of said wheel, a brake hanger lever for supporting said brake shoe and having an opening formed therein at its end remote from said brake shoe, a brake hanger lever support on said frame having an opening formed therein, said frame having an opening formed therein, a brake operating lever for applying said brake shoe extending through said frame opening and adapted for movement therein, a pin for pivotally securing said brake hanger lever to said support arranged in said openings in said brake hanger lever and said support, means for preventing said pin from moving axially in one direction, and an L-shaped brake hanger pin retaining and brake operating lever wear plate member having one leg portion removably secured to said frame and its other leg portion extending through said frame opening and adjacent an end of said pin for preventing said pin from moving axially in other direction, said other leg portion being arranged parallel to the movement of said brake operating lever for providing a wear plate to prevent wear on the sides of said frame opening by movement of said brake operating lever.

WILLIAM R. SCHETTLER.

REFERENCES CITED

The following references are of record in the file of this patent:

UNITED STATES PATENTS

| Number | Name | Date |
|---|---|---|
| 2,133,531 | Blomberg | Oct. 18, 1938 |
| 2,166,887 | Aurien | July 18, 1939 |